(12) United States Patent
Fay et al.

(10) Patent No.: US 8,237,548 B2
(45) Date of Patent: Aug. 7, 2012

(54) STRUCTURAL HEALTH MANAGEMENT DEVICE AND ASSOCIATED SYSTEM AND METHOD

(75) Inventors: Matthew K. Fay, Wentzville, MO (US); Justin D. Kearns, Seattle, WA (US); Gerardo Pena, Seattle, WA (US); Jason P. Bommer, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/791,300

(22) Filed: Jun. 1, 2010

(65) Prior Publication Data
US 2011/0291802 A1 Dec. 1, 2011

(51) Int. Cl.
*H04Q 5/22* (2006.01)
(52) U.S. Cl. ............ 340/10.1; 340/10.41; 340/539; 324/649
(58) Field of Classification Search ............ 340/10.1, 340/10.4, 10.41, 10.42, 572.1, 3.1, 3.3, 3.31, 340/3.5, 870.07, 870.16, 539.22; 324/649, 324/76.11, 700
See application file for complete search history.

(56) References Cited

U.S. PATENT DOCUMENTS

| | | | |
|---|---|---|---|
| 4,013,924 A * | 3/1977 | Christensen et al. ............ 361/49 |
| 4,924,211 A * | 5/1990 | Davies ........................ 340/573.4 |
| 6,617,963 B1 * | 9/2003 | Watters et al. ............. 340/10.41 |
| 6,853,294 B1 | 2/2005 | Ramamurthy et al. |
| 7,142,092 B2 | 11/2006 | Ramamurthy et al. |
| 7,249,302 B2 | 7/2007 | Maltseff et al. |
| 7,395,474 B2 | 7/2008 | Maltseff et al. |
| 7,621,193 B2 | 11/2009 | Fay et al. |
| 2006/0090558 A1 | 5/2006 | Raskas |
| 2008/0183402 A1 | 7/2008 | Malkin et al. |
| 2008/0289426 A1 | 11/2008 | Kearns et al. |
| 2008/0319692 A1 | 12/2008 | Davis et al. |
| 2009/0058427 A1 * | 3/2009 | Materer et al. ............... 324/649 |
| 2009/0093999 A1 | 4/2009 | Kearns et al. |
| 2009/0126471 A1 | 5/2009 | Fay et al. |

(Continued)

FOREIGN PATENT DOCUMENTS
JP 2007-163324 A 6/2007

OTHER PUBLICATIONS
U.S. Appl. No. 12/750,496, filed Mar. 30, 2010, entitled *Transmission Line Moisture Sensor*. European Search Report for Application No. EP 11 16 6121 dated Oct. 17, 2011.

*Primary Examiner* — Nabil Syed
(74) *Attorney, Agent, or Firm* — Alston & Bird LLP

(57) ABSTRACT

A structural health management device, system and method are provided for facilitating the inspection of a structure, such as in accordance with a condition-based maintenance strategy. A structural health management device may include a radio frequency identification (RFID) tag and at least one sense line communicably coupled to the RFID tag and configured to extend at least partially along a workpiece. The sense line may be formed of different materials depending upon the objective of the inspection. The RFID tag may include processing circuitry and an antenna configured to facilitate offboard communication. The processing circuitry may be configured to interrogate the at least one sense line to determine a change in continuity which is indicative of a change in the structural health of the workpiece. The structural health management device may therefore detect the onset of structural issues in a timely manner.

20 Claims, 3 Drawing Sheets

U.S. PATENT DOCUMENTS

| | | |
|---|---|---|
| 2009/0128169 A1 | 5/2009 | Fay et al. |
| 2009/0193814 A1* | 8/2009 | Lofy ............................. 62/3.61 |
| 2010/0052704 A1 | 3/2010 | Fay et al. |
| 2010/0052911 A1 | 3/2010 | Matsen et al. |
| 2010/0123583 A1 | 5/2010 | Bommer |
| 2010/0134257 A1* | 6/2010 | Puleston et al. ............. 340/10.4 |

* cited by examiner

STRUCTURAL HEALTH MANAGEMENT DEVICE AND ASSOCIATED SYSTEM AND METHOD

TECHNOLOGICAL FIELD

Embodiments of the present disclosure relate generally to structural health management and, more particularly, to devices, systems and methods for monitoring a workpiece and for providing information regarding the structural health of the workpiece.

BACKGROUND

A variety of structures are routinely inspected to determine the health of the structure and to identify any issues that may require further inspection, maintenance or repair. For example, buildings, bridges and the like may be regularly inspected to identify the onset of any issues that may potentially weaken or otherwise eventually render the structure unsuitable for its intended use. Similarly, vehicles, such as airplanes, trains, ships and the like, may be regularly inspected in order to similarly identify any issues that merit further inspection, maintenance or repair.

For example, commercial aircraft may be subject to periodic scheduled inspections. During these inspections, the aircraft must generally be removed from service to permit an intensive visual inspection of the aircraft to be conducted. In this regard, at least some aircraft inspections involve substantial disassembly of the aircraft in order to visually inspect the various components. For example, substantial disassembly of an aircraft may be required in order to inspect for corrosion damage and/or to identify crack propagation in regions of the aircraft that have limited accessibility.

By way of further example, the metallic floor structures supporting the main cabin floor beneath the galleys, lavatories and in the immediate proximity to the passenger entry and service doors are considered wet areas of the cabin floor because of their potential exposure to moisture, such as in the event of inclement weather as well as during normal passenger food and beverage service. The flooring in these wet areas is sealed in order to prevent moisture on the upper surface of the floor from penetrating through the floor into the floor support structure where the moisture may cause the floor support structure to corrode. In this regard, corrosion of the floor support surface is desirably avoided as the floor support structure includes, among other structural elements, the metallic floor beams, which are primary load bearing elements of the aircraft structure.

In order to visually inspect the floor support structure, cabin equipment including seats, floor coverings, galleys and lavatories must generally be removed. In addition, the sealed cabin floor panels must then be removed to expose the upper portions of the floor support structure. As will be recognized, the time and effort that will be required in order to visually inspect the floor support surface may be substantial, thereby potentially requiring the aircraft to remain out of service for a substantial period of time. Additionally, the removal of the cabin floor panels breaks the seal with which the floor panels had previously been secured to the floor support surface and it may prove difficult, if not impossible, to reseal the floor with at least the same degree of integrity as the floor was sealed during the original manufacture of the aircraft. Additionally, as with any inspection that requires substantial disassembly, the disassembly itself may accidentally damage the structure and/or the removed component such that additional maintenance or repair activities are required.

As noted above, another structural component that may be periodically inspected is the cutouts in the pressurized fuselage, such as cutouts in the crown section of the fuselage to accommodate antennas. As with the floor support structure, significant disassembly may be required in order to remove those portions of the cabin interior that are necessary in order to visually inspect the fuselage cutouts, as well as the reinforcing doublers that are attached to the fuselage skin panel about the fuselage cutouts by a plurality of fasteners.

In addition to the time and effort required to conduct a visual inspection, reliance upon scheduled inspections may be disadvantageous in that scheduled inspections may occur and may require the aircraft to be temporarily taken out of service in instances in which the aircraft has no structural issues and is determined not to be in need of any repair. Conversely, a scheduled inspection may occur later than desired in other instances in which a structural issue has developed and the lapse of the time that occurs between scheduled inspection is such that the structural issue is allowed to propagate or otherwise damage the surrounding structure such that more extensive repairs are required than if the structural issue had been identified soon after its inception.

It would therefore be desirable to provide improved techniques for inspecting a structure such that the inspection may be conducted efficiently, cost effectively and in a timely manner. In this regard, it would be desirable to provide improved inspection techniques for identifying cracks, moisture ingress or other structural issues in a timely fashion following the inception of the structural issues, while not requiring a structure to be removed from service for a prolonged period in order to be inspected in instances in which the structural issues have not yet arisen. Additionally, it would be desirable to provide an improved technique for inspecting structures which reduces the disassembly otherwise required for conventional visual inspection.

BRIEF SUMMARY

A structural health management device, system and method are provided in accordance with embodiments of the present disclosure for facilitating the inspection of a structure in an efficient, cost effective and timely manner. The structural health management device, system and method of one embodiment facilitates a condition-based maintenance strategy in which maintenance activities, such as visual inspection, repair or the like, need only be conducted once there has been an identified change in the structural health and not merely in accordance with a predefined schedule. Thus, the structural health management device, system and method may reduce the time that a structure must be removed from service in order to be inspected and may make any such inspections more efficient by identifying those regions of the structure that merit a visual inspection, along with the attended disassembly. Thus, the structural health management device, system and method of one embodiment may reduce the time required for the resulting inspections and may therefore increase the efficiency of the inspections and reduce the likelihood of damage that may otherwise occur during an inspection.

In one embodiment, a structural health management device is provided that includes a radio frequency identification (RFID) tag and at least one sense line communicably coupled to the RFID tag and configured to extend at least partially along a workpiece. The RFID tag includes processing circuitry and an antenna configured to facilitate offboard communication. The processing circuitry of the RFID tag is configured to interrogate the at least one sense line to determine a change in continuity of the at least one sense line which is indicative of a change in the structural health of the workpiece. The structural health management device of this embodiment may therefore detect the onset of structural issues that may impact the structural health of the workpiece in a timely manner and may facilitate the implementation of a condition-based maintenance strategy in which the workpiece is visually inspected and maintenance activities occur in response to a change in the structural health of the workpiece, as opposed to in accordance with a predefined schedule.

The processing circuitry of the RFID tag may be configured to interrogate the at least one sense line to determine an instance in which the at least one sense line is broken. The processing circuitry of the RFID tag may be responsive to external interrogation so as to cause information regarding the change in the continuity of the at least one sense line to be transmitted offboard the RFID tag via the antenna.

The at least one sense line may extend outwardly from the RFID tag and, in at least one embodiment, is distinct from the antenna of the RFID tag. In one embodiment in which the structural health management device is intended to detect moisture ingress, the at least one sense line may be comprised of the material that dissolves in the presence of moisture. For example, the at least one sense line may include a plurality of discrete portions comprised of a material that dissolves in the presence of moisture and spaced apart along the at least the sense line. In another embodiment in which the structural health management device is intended to detect exposure to elevated temperatures, the at least one sense line may be comprised of a material that melts upon exposure to a temperature above a predefined threshold. In yet another embodiment, a pair of sense lines may be provided that define an open circuit in absence of fluid and that are configured to be electrically connected by fluid extending between the pair of sense lines. The structural health management device of one embodiment may also include a gasket or membrane that carries the RFID tag and the at least one sense line and is configured to be mounted upon the workpiece, thereby facilitating application of the structural health management device to the workpiece.

In another embodiment, a structural health management system is provided that includes a structural health management device and a reader configured to interrogate the structural health management device to obtain information regarding a change in the structural health of the workpiece. The structural health management device of this embodiment may include a radio frequency identification (RFID) tag comprising processing circuitry and an antenna configured to facilitate offboard communication. The structural health management device of this embodiment may also include at least one sense line communicably coupled to the RFID tag and configured to extend at least partially along the workpiece. The processing circuitry of the RFID tag of this embodiment is configured to interrogate the at least one sense line to determine a change in continuity of the at least one sense line indicative of a change in the structural health of the workpiece. By interrogating the structural health management device, the reader may obtain information regarding the change in the continuity of the at least one sense line of the structural health management device and may, in turn, alert a technician or other user of situations meriting further inspection, e.g., a visual inspection, maintenance or repair activities in an efficient and timely manner.

In one embodiment designed to detect moisture ingress, the at least one sense line of the structural health management device may be comprised of a material that dissolves in the presence of moisture. In another intended to detect exposure to elevated temperatures, the at least one sense line may be comprised of a material that melts upon exposure to a temperature above a predefined threshold. The structural health management device of one embodiment may include a gasket or membrane that carries the RFID tag and the at least one sense line and is configured to be mounted upon the workpiece.

In another embodiment, a method is provided for structural health management. The method includes monitoring the structural health of a workpiece with the structural health management device that is carried by the workpiece. The structural health management device includes a radio frequency identification (RFID) tag including processing circuitry and an antenna configured to facilitate offboard communication. The structural health management device may also include at lease one sense line communicably coupled to the RFID tag and configured to extend at least partially along the workpiece. The monitoring of the structural health of the workpiece includes interrogating the at least one sense line with a processing circuitry of the RFID tag so as to determine a change in the continuity of the at least one sense line. This change in the continuity of the at least one sense line is, in turn, indicative of a change in the structural health of the workpiece. The method of this embodiment also transmits information regarding the change in the continuity of the at least one sense line offboard the structural health management device via the antenna.

In one embodiment, the structural health management device is interrogated via a reader external to the workpiece with the transmission of information regarding any change in continuity being responsive to the interrogation. In this regard, a technician may be provided with an inspection plan including the identification of the structural health management devices carried by the workpiece that are to be inspected. In this embodiment, the interrogation of the structural health management device may include the interrogation of each structural health management device carried by the workpiece that is to be inspected. The method of this embodiment may also include providing the technician with an indication of at least one of the structural health management devices that has been interrogated and/or the structural health management devices that remain to be interrogated as well as an indication of the structural health of that portion of the workpiece associated with at least one of the structural health management devices that has been interrogated.

Interrogating the at least one sense line may include the interrogation of the at least one sense line to determine an instance in which the at least one sense line is broken. In one embodiment, a gasket or membrane that carries the structural health management device may be applied to the workpiece. A method of one embodiment may also store information regarding maintenance of the workpiece in a memory device of the structural health management device.

In accordance with embodiments of the structural health management device, system and method, a workpiece may be inspected in an efficient, cost effective and timely manner. However, the features, functions and advantages that have been discussed may be achieved independently in various embodiments of the present disclosure and may be combined in yet other embodiments, further details of which may be seen with reference to the following description and drawings.

BRIEF DESCRIPTION OF THE SEVERAL VIEWS OF THE DRAWING(S)

Having thus described embodiments of the present disclosure in general terms, reference will now be made to the accompanying drawings, which are not necessarily drawn to scale, and wherein:

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Figure 1:
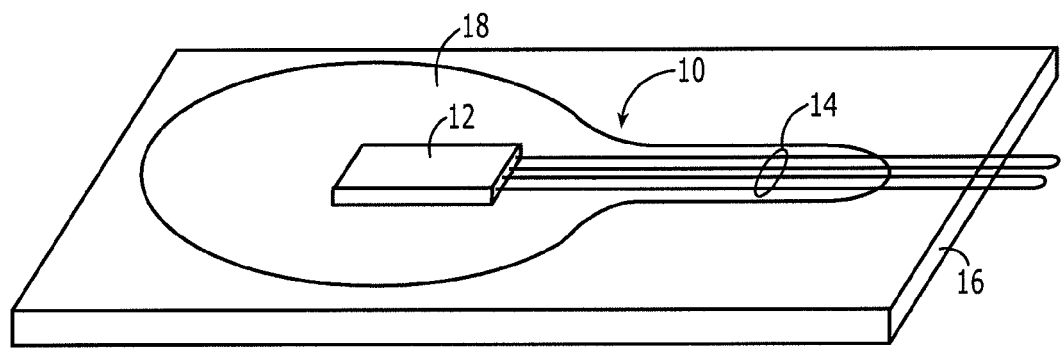
FIG. 1 is an illustration of a structural health management device in accordance with one embodiment to the present disclosure.

Referring now to FIG. 1, a structural health management device 10 is depicted. The structural health management device includes a radio frequency identification (RFID) tag 12 and one or more sense lines 14 that are in communication with the RFID tag and that extend outwardly therefrom. As described below, the structural health management device may be mounted upon, attached or otherwise carried by a workpiece 16 so as to provide information regarding the structural health of the workpiece. As described below, the structural health management device may monitor various aspects of the structural health of the workpiece depending upon the type of sense line(s) that are employed. For example, the structural health management device may monitor the workpiece to detect cracks in the workpiece, to detect the presence of moisture and/or to detect exposure to elevated temperatures.

A structural health management device 10 may monitor various types of workpieces 16. For example, a structural health management device may be mounted upon an aircraft, such as upon portions of the fuselage of an aircraft, in order to monitor the structural health of the aircraft. Alternatively, the structural health management device may be mounted upon other vehicles, such as trains, ships or the like. Further, the structural health management device may be mounted upon buildings, bridges or other structures for which it is useful to monitor the structural health. By monitoring the structural health of a workpiece, the structural health management device can provide information regarding the structural health of the workpiece such that technicians or others may track the structural health and may intervene in order to make more detailed inspections including, for example, visual inspections, and/or to make various repairs or perform other types of maintenance activities in order to insure that the workpiece is maintained in operational condition.

The structural health management device 10 and, in particular, the sense lines 14 of one embodiment may be advantageously positioned upon the workpiece 16 so as to extend through or across those regions of the workpiece that are of interest in terms of monitoring the structural health of the workpiece. With respect to an aircraft, for example, the structural health management device may be mounted upon the aircraft such that the sense lines extend about the cutouts in the fuselage, such as the cutouts in the crown section of the fuselage that serve to accommodate antennas, since the portion of the fuselage proximate the cutouts may be susceptible to fatigue cracks. Additionally or alternatively, the structural health management device may be mounted upon an aircraft such that the sense lines extend along the floor structure that supports the cabin floor in the wet areas of an aircraft in order to detect the ingress or other exposure to moisture.

Figure 2:
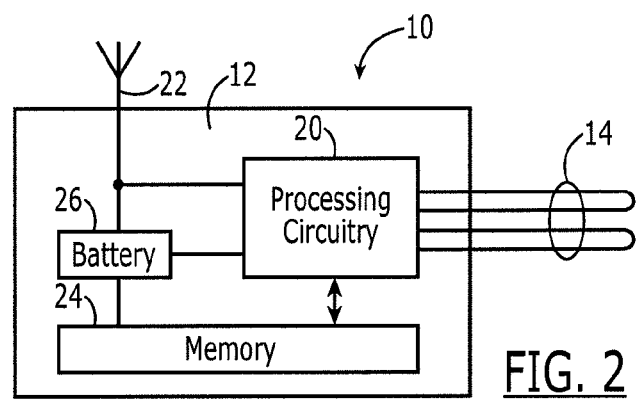
FIG. 2 is a block diagram of a structural health management device in accordance with one embodiment of the present disclosure.

As shown in the block diagram of FIG. 2, the RFID tag 12 may include processing circuitry 20, such as a processor, a controller or other specifically configured circuitry, such as an application specific integrated circuit (ASIC), a field programmable gate array (FPGA) or the like. The RFID tag may also include one or more antennas 22, such as a microstrip antenna, for facilitating communications offboard of the RFID tag, such as radio frequency communications with a remote reader. The processing circuitry may control the transmission of information via the antenna, and may also receive information based upon the signals received by the antenna. In this regard, the processing circuitry may include or otherwise communicate with a transmitter, receiver, a transceiver or the like for facilitating communications via the antenna. The RFID tag may also include a memory device 24, such as a random access memory device, a read-only memory device or the like. Although the memory device may store a variety of data and information, the memory device of one embodiment may store computer program instructions that are accessible by and executed by the processing circuitry for controlling the operations of the processing circuitry. Although the RFID tag may include a battery so as to be actively powered, the RFID tag of one embodiment is passive in that the RFID tag receives power for its operation via the scavenging or energy harvesting of other signals that are received by the antenna. Thus, the RFID tag may include a battery 26 for storing the power provided via the scavenging or energy harvesting of other signals received by the antenna and for supplying power to the processing circuitry and other components.

As noted above, the structural health management device 10 includes one or more sense lines 14 that extend outwardly from the RFID tag 12. The sense lines may be communicably coupled to the RFID tag, such as by being conductively connected to respective ports, pins or the like of the RFID tag. Although in communication via the processing circuitry 20 with the antenna 22 of the RFID tag, the sense lines are otherwise distinct from the antenna and need not be configured to support offboard communications as required of an antenna, thereby providing much greater flexibility in terms of the placement of the sense lines upon the workpiece and in terms of the materials from which the sense lines may be constructed. The processing circuitry 20 of the RFID tag is in communication with the sense lines so as to transmit signals via respective ones of the sense lines, such as relatively low frequency data pulses, and to receive responsive signals via the sense lines, that is, signals that are responsive to the data pulses transmitted via the sense lines, that are indicative of the continuity, or lack thereof, of the sense lines. The processing circuitry may be configured to detect various types of responsive signals including, for example, measurements of the DC resistance and/or the insertion loss of the sense lines.

Figure 3:
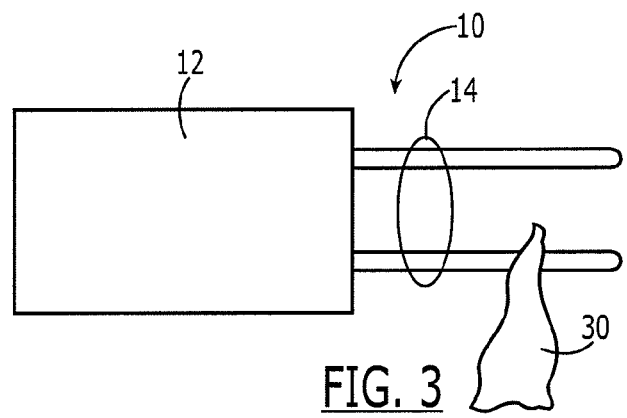
FIG. 3 is an illustration of a structural health management device in accordance with one embodiment of the present disclosure in which one of the sense lines has been broken by a crack propagating through the workpiece.

The sense lines 14 may be formed of various materials depending upon the issue that is intended to be detected. In order to detect a crack, such as a crack in the fuselage of an aircraft, the sense lines may be traces formed of a conductive material, such as copper or nickel, that are disposed on, either directly or via one or more intervening layers, the surface of the workpiece 16 to be inspected. In the embodiment illustrated, for example, in FIGS. 1 and 2, the sense lines are continuous loops that extend between a pair of ports of the RFID tag 12. The sense lines may therefore be interrogated, such as by the processing circuitry 20 of the RFID tag 12, by the transmission of data pulses along the length of the sense lines and the analysis of the signals responsive to the data pulses. In instances in which the sense line extending between the first and second ports is continuous, the data pulses will be provided via the first port, will propagate along the sense line and will return to the RFID tag via the second port. In instances in which the underlying workpiece has cracked and the crack 30 has propagated across a sense line as shown in FIG. 3, however, the sense line may also crack or otherwise separate so as to no longer to be continuous. In this embodiment, the interrogation of the sense line that has cracked will not produce a return signal to the RFID tag. Thus, the processing circuitry may detect a lack of continuity in the respective sense line based upon the lack of a return signal responsive to the data pulse interrogation. In some embodiments, the data pulse may reflect from the broken end of the sense line that has been created by the crack with the reflected data pulse being returned to the RFID tag via the same port via which the data pulse was introduced such that the processing circuitry may determine the approximate location of the crack based upon the elapsed time between the transmission of the data pulse and the return signal. Although several embodiments of the sense lines and their interrogation are described above, the sense lines may be configured and interrogated in different manners in other embodiments.

Additionally, the processing circuitry 20 of the RFID tag 12 may determine the extent of the crack 30 by reviewing the results of the interrogation of several sense lines 14. As shown in FIG. 3, two or more pairs of sense lines may extend in parallel or otherwise alongside one another across a workpiece 16. In the instance shown in FIG. 3, the crack tip has propagated across one pair of the sense lines and caused the respective sense line to separate, but has not yet propagated across the adjacent pair of sense lines such that the adjacent sense lines remain continuous. Thus, the processing circuitry may determine that one of the pairs of sense lines has broken, but that the adjacent pair of sense lines remains continuous. In this situation, the processing circuitry may identify the crack to have propagated across the first pair of sense lines, but not the second pair of sense lines such that the crack tip may reside between the first and second pairs of sense lines. Such information regarding the location and extent of a crack may facilitate the repair of the workpiece. Moreover, by including sense lines that are distinct from the antenna 22 of the RFID tag, the RFID tag may affirmatively respond to interrogation by a reader 40 or otherwise such that the reader can readily discriminate between instances in which an RFID tag responds in a manner indicating that the sense line is no longer continuous and instances in which the RFID tag itself has become inoperative and fails to provide any response.

In another embodiment, the structural health management device 10 is configured to detect moisture ingress such that steps may be taken to avoid or limit corrosion. In this embodiment, the sense lines 14 may be formed of a material, such as a conductive ink, such as CI-1001 ink developed by Engineered Conductive Materials, on a water-soluble substrate, such as polyvinyl alcohol (PVA), that dissolves in the presence of moisture, but that is otherwise conductive. Thus, following installation and in the absence of moisture, the sense lines may extend continuously across the workpiece 16, such as shown in FIG. 1. Upon the exposure to moisture, however, the portion(s) of the sense lines that is exposed to moisture may dissolve such that the sense line is no longer continuous. In this regard, the interrogation of the sense line by the RFID tag 12 will detect that the sense line is no longer continuous and will, instead, sense a break in the sense line based upon for example, the absence of response signals or the return of response signals in a more rapid fashion. As before, the RFID tag, such as the processing circuitry 20, of one embodiment may analyze the elapsed time between the transmission and receipt of the signals via the sense line and may determine an approximate location at which the sense line has dissolved and, therefore, an approximate location of the moisture ingress.

Figure 4:
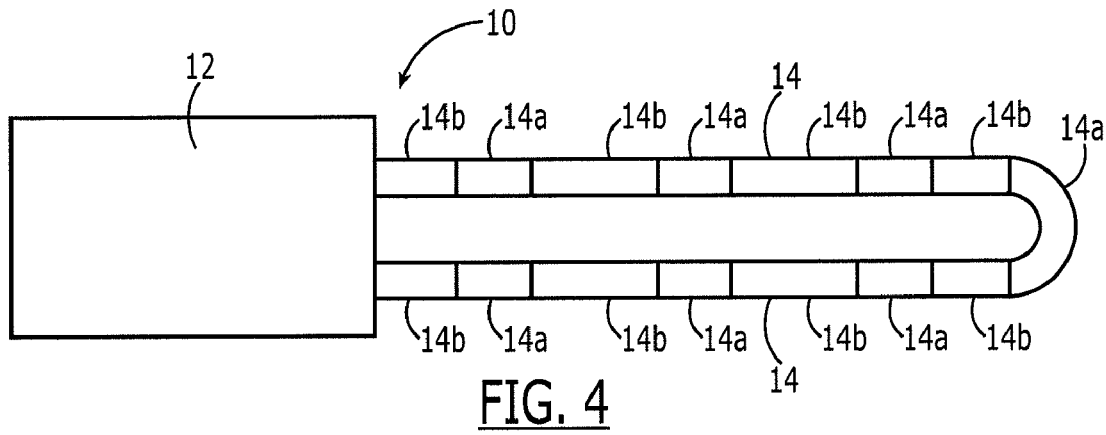
FIG. 4 is an illustration of the structural health management device in accordance with one embodiment of the present disclosure in which the sense lines include a plurality of discrete portions comprised of a material that dissolves in the presence of moisture.

In one embodiment in which the sense lines 14 extend across a workpiece 16 having several regions that are sensitive to moisture ingress and other regions that are insensitive to moisture ingress, the sense lines may be formed of different materials. As shown in FIG. 4, for example, a sense line of this embodiment may include portions 14a spaced apart along the length of the sense line that are formed of a material that dissolves in the presence of moisture, while the remainder 14b of the sense line may be formed of a conductive material that does not dissolve in response to moisture. The relative sizes and positions of the different portions of the sense line may be formed such that those portions of the sense line that are formed of material that dissolve in response to moisture are positioned on or along those portions of the workpiece that are sensitive to moisture, while the other portions of the sense line that do not dissolve in the presence of moisture are positioned upon those portions of the workpiece that are insensitive to moisture. Thus, moisture that is present in those regions that are insensitive to moisture will not cause the sense line to dissolve or break and will therefore not adversely affect the operation of the structural health management device 10. Instead, the sense line of this embodiment is tailored such that only moisture ingress in the regions that are sensitive to moisture will cause the sense line to dissolve so as to provide an indication of the presence of moisture in an area that is sensitive to moisture such that appropriate remedial action may be taken.

In another embodiment in which the structural health management device 10 is configured to identify the exposure of the workpiece 16 to excessive temperatures, such as a temperature in excess of a predefined threshold temperature, the sense lines 14 may be formed of a material, such as epoxy or resin, that melts, e.g., dissolves, evaporates or otherwise disappears, in response to its exposure to a temperature at or above the predefined threshold temperature. Thus, the processing circuitry 20 of the RFID tag 12 may interrogate the sense lines and may determine that at least a portion of the workpiece has been exposed to an excessive temperature in an instance in which the sense line is no longer continuous, but which, instead, has an open circuit therein, such as a result of the melting of that portion of the sense line in response to exposure to a temperature in excess of the predefined threshold temperature.

Figure 5:
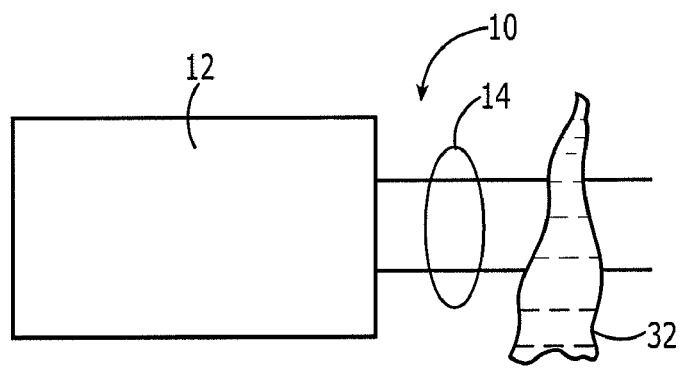
FIG. 5 is an illustration of structural health management device in accordance with one embodiment of the present disclosure in which a fluid establishes electrical continuity between the sense lines.

The structural health management device 10 of another embodiment may be configured to detect the presence of fluid. In this embodiment depicted in FIG. 5, the structural health management may include a plurality of sense lines 14 that extend outwardly from the RFID tag 12. Unlike the sense lines of the embodiments of FIGS. 1-4, the sense lines of the embodiment of FIG. 5 extend outwardly from only a single port of the RFID tag and do not form a continuous loop. In the absence of fluid, the sense lines do not form a continuous current path, but are, instead, open circuits such that the absence of fluid may be confirmed by the failure to detect any return signal in response to the transmission of interrogation signals along the sense lines. In instances in which a fluid of sufficient conductivity (such as a fluid having a conductivity of at least 0.1 Siemens per meter (S/m)) extends across the sense lines as shown in FIG. 5, however, the fluid serves to connect the sense lines and close the circuit such that the interrogation signals transmitted along either one of the sense lines returns via the other sense line. The return signal may be detected and recognized by the processing circuitry 20 as indicative of the presence of fluid.

As shown in FIG. 1, the structural health management device 10 may also include a gasket or membrane 18 that carries the RFID tag 12 and the at least one sense line 14. The gasket or membrane may be formed of material, such as a polymer or the like, and the RFID tag and the sense lines may be mounted upon the gasket or membrane. In one embodiment, the surface of the gasket or membrane opposite the RFID tag may include an adhesive, such as Hysol 9396 or FM 73, such that the gasket or membrane may be adhered to the surface of the workpiece, such as an interior surface of the fuselage of an aircraft, such as proximate a cutout, or along the floor structure underlying a wet area. Alternatively, the gasket or membrane may be attached to the workpiece in other fashions, such as by curing the gasket or membrane.

In one embodiment, a plurality of structural health management devices 10 may be mounted upon and carried by a single workpiece 16, such as the fuselage of an aircraft. In the embodiment depicted in FIG. 6, the structural health management devices are shown in dashed lines as the structural health management devices are disposed upon interior surfaces of the fuselage so as not to alter the aerodynamic performance of the aircraft. In this regard, the structural health management devices may be positioned proximate regions that are difficult to visually inspect, but which may be prone to cracking, moisture or excessive temperatures. In this regard, the structural health management devices may be positioned proximate cutouts within the fuselage, such as the cutouts for receiving antennas. Additionally, the structural health management devices may be positioned along the floor structure that underlies wet areas of an aircraft.

As described below, the structural health management devices 10 may then be interrogated, such as by a reader 40, such that the reader may obtain information regarding any change in the continuity of a sense line 14 of a structural health management device. By imploring passive RFID tags 12, the reader need not make physical contact with the workpiece 16 or the structural health management devices carried by the workpiece and, instead, can communicate wirelessly with the structural health management devices such that an inspection may be conducted in an efficient manner.

Figure 6:
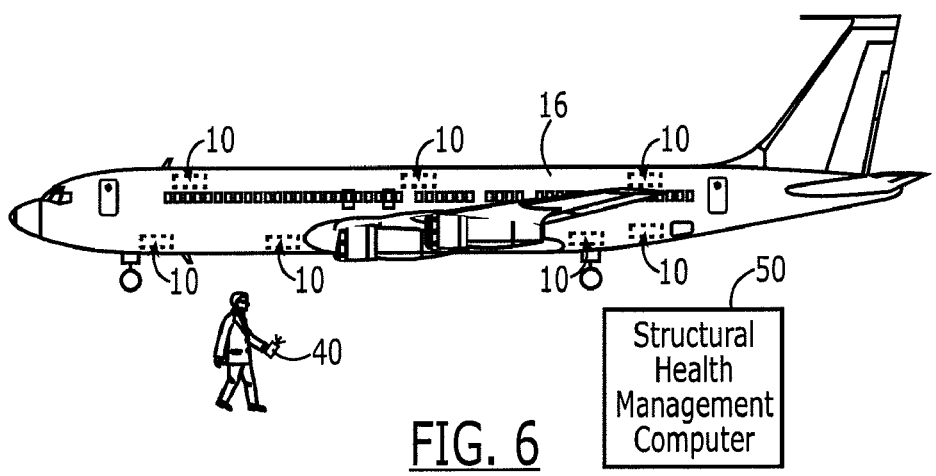
FIG. 6 is a perspective view of an aircraft having a structural health management system in accordance with one embodiment of the present disclosure.

In one embodiment, the RFID tag 12 may be programmed with relevant information associated with the maintenance of the workpiece 16 at the time of or following its being mounted to the workpiece. See, for example, operations 60 and 62 of FIG. 7. With respect to a structural health management device 10 that is to be mounted in a particular location upon an aircraft, the RFID tag may be programmed with the aircraft tail number, the inspection history and the positional coordinates of the location of the RFID tag upon the aircraft. In one embodiment, this information may be stored by the memory device 24 of the RFID tag. As also shown in FIG. 6, the structural health management system of one embodiment may also include a computer 50, including, for example, a processor and an associated memory device, for storing information regarding each of the structural health management devices mounted upon the workpiece including, for example, an identity of the structural health management device, the location of the structural health management device upon the workpiece and the inspection history of that portion of the workpiece as reported by the respective structural health management device. See operation 64 of FIG. 7.

Figure 7:
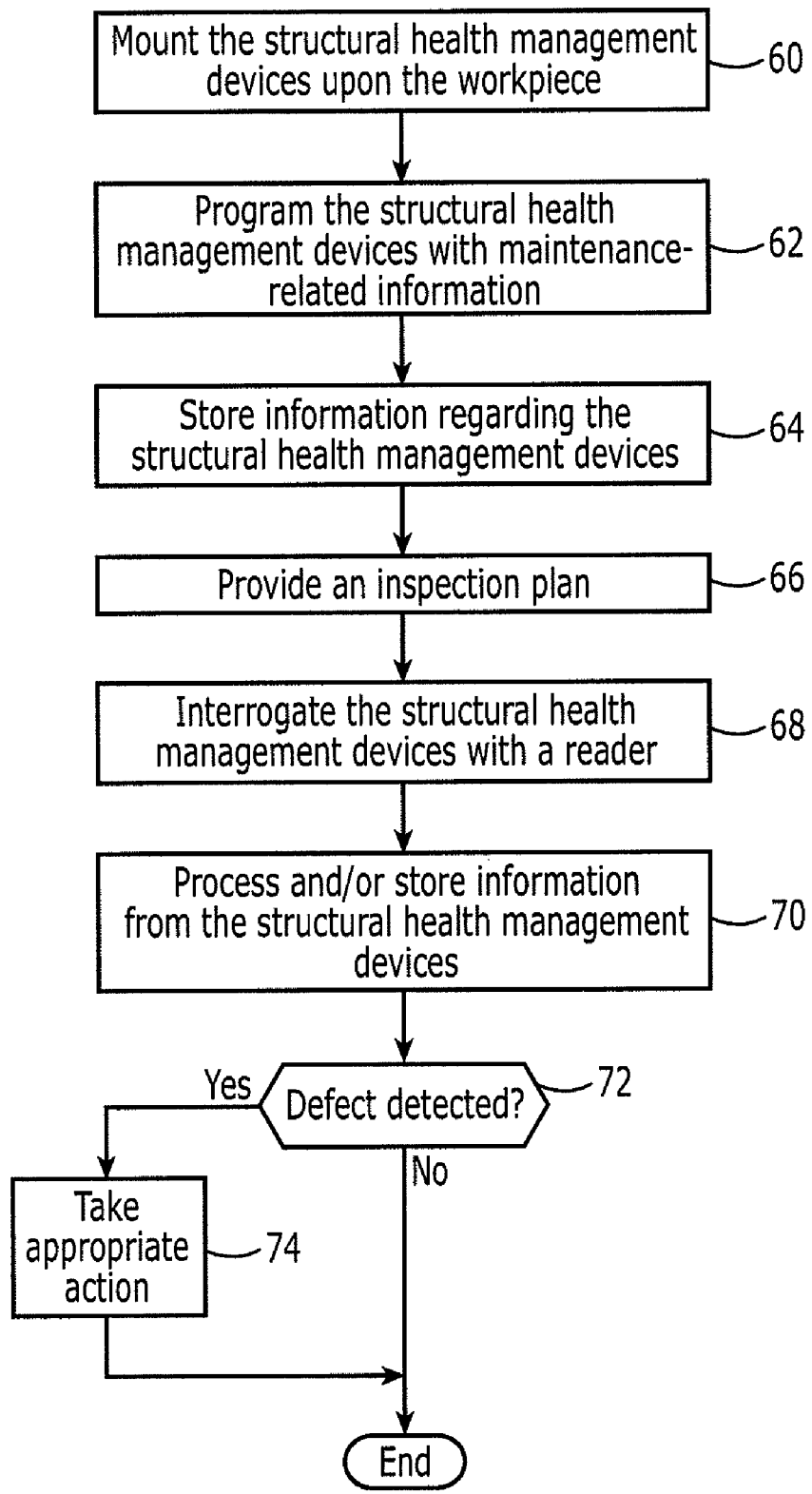
FIG. 7 is a flowchart illustrating operations performed in accordance with a method for structural health management in accordance with one embodiment to the present disclosure.

The computer 50 of the structural health management system may also direct the inspection of the workpiece 16, such as by means of an inspection plan as shown in operation 66 of FIG. 7. For example, the computer may provide information regarding the plurality of structural health management devices 10 carried by the workpiece as well as the respective locations of the structural health management devices. In addition, the computer may direct or suggest the order in which the reader 40 interrogates the structural health management devices and may provide an indication as to which structural health management devices have been interrogated and which remain to be interrogated to facilitate the inspection.

During an inspection, an inspector may utilize a reader 40 to inspect a first structural health management device 10 in order to obtain information regarding the structural health of that portion of the workpiece 16 upon which structural health management device is mounted as indicated by the continuity, or not, of its sense lines 14. The reader may then interrogate a second structural health management device and so on until each of the structural health management devices that are intended to be interrogated have been interrogated. In this regard, the reader may receive information, such as an inspection plan, from the computer 50 of the structural health management system that identifies the various structural health management devices and their respective locations, as well as the suggested order in which the structural health management devices are to be inspected. The reader, in turn, may provide this information including the suggested order of inspection to the technician, such as by means of a display of the reader, to facilitate an orderly and efficient interrogation of the structural health management devices. See operation 68 of FIG. 7.

The reader 40 may process the information provided by the structural health management devices 10 and/or may provide the information to the computer 50 of the structural health management system for processing and/or storage. See operation 70 of FIG. 7. Regardless of whether the reader or the computer of the structural health management system performs the processing, the information provided by the structural health management devices may be analyzed to determine if the sense lines 14 remain continuous or if the sense lines have broken, dissolved or are otherwise experiencing an open circuit. In an instance in which the sense lines are determined to no longer be continuous, the type of defect or other issue may be identified based upon the type of defect or other issue that the sense lines of the structural health management device are intended to detect, such as cracks, moisture ingress, temperature excursions or the like. The computer 50 of the structural health management system may then notify maintenance personnel of the defect or other issues with the workpieces along with the approximate location of the defect or other issue. Maintenance personnel may then conduct a further inspection, such as a visual inspection, or otherwise address the defect or other issue prior to the defect or other issue growing larger, such as by the propagation of a crack, continued corrosion or the like, which would, in turn, necessitate more extensive and expensive repairs. See operations 72 and 74 of FIG. 7.

By employing structural health management devices 10 in regions that are not readily subject to visual inspection, however, maintenance personnel need not routinely access those regions of the workpiece 16, such as by disassembling portions of the workpiece, in order to visually inspect those portions of the workpiece. Instead, the interrogation of the structural health management devices by the reader 40 will effectively inspect those portions of the workpiece in a more efficient and cost effective manner. With respect to an aircraft, for example, inspections by means of a structural health management device 10 may reduce the amount of time that an aircraft must be taken out of service in order to perform relatively extensive visual inspection, while still providing meaningful information regarding the onset of any damage or other issues that should be addressed. Further, as a result of the efficiency with which the workpiece may be inspected, a workpiece may be inspected more frequently, thereby permitting damage or other issues to be identified more quickly such that maintenance activities can be undertaken without permitting the damage or other issues to escalate.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A structural health management device comprising:
a radio frequency identification (RFID) tag comprising processing circuitry and an antenna configured to facilitate offboard communication;
and at least one sense line communicably coupled to the RFID tag and configured to extend at least partially along a workpiece, wherein the at least one sense line includes a plurality of discrete first portions comprised of a material that dissolves in the presence of moisture and spaced apart along the at least one sense line and a plurality of discrete second portions positioned between and connecting the first portions and formed of a conductive material that does not dissolve in response to moisture, wherein the first portions of the at least one sense line are positioned along respective portions of the workpiece that are sensitive to moisture and the second portions of the at least one sense line are positioned along respective portions of the workpiece that are insensitive to moisture;
wherein the processing circuitry of the RFID tag is configured to interrogate the at least one sense line to determine a change in continuity of the at least one sense line indicative of a change in structural health of the workpiece.

2. A structural health management device of claim 1 wherein the processing circuitry of the RFID tag is configured to interrogate the at least one sense line to determine an instance in which the at least one sense line is broken.

3. A structural health management device of claim 1 wherein the at least one sense line extends outwardly from the RFID tag and is distinct from the antenna of the RFID tag.

4. A structural health management device of claim 1 wherein the processing circuitry of the RFID tag is responsive to external interrogation so as to cause information regarding the change in the continuity of the at least one sense line to be transmitted offboard the RFID tag via the antenna.

5. A structural health management device of claim 1 wherein the at least one sense line is comprised of a material that melts upon exposure to a temperature above a predefined threshold.

6. A structural health management device of claim 1 wherein the at least one sense line comprises a pair of sense lines that define an open circuit in absence of fluid and that are configured to be electrically connected by fluid extending between the pair of sense lines.

7. A structural health management device of claim 1 further comprising at least one of a gasket or membrane that carries the RFID tag and the at least one sense line and is configured to be mounted upon the workpiece.

8. A structural health management system comprising:
a structural health management device comprising a radio frequency identification (RFID) tag comprising processing circuitry and an antenna configured to facilitate offboard communication, and
at least one sense line communicably coupled to the RFID tag and configured to extend at least partially along a workpiece, wherein the at least one sense line includes a plurality of discrete first portions comprised of a material that dissolves in the presence of moisture and spaced apart along the at least one sense line and a plurality of discrete second portions positioned between and connecting the first portions and formed of a conductive material that does not dissolve in response to moisture, wherein the first portions of the at least one sense line are positioned along respective portions of the workpiece that are sensitive to moisture and the second portions of the at least one sense line are positioned along respective portions of the workpiece that are insensitive to moisture;
wherein the processing circuitry of the RFID tag is configured to interrogate the at least one sense line to determine a change in continuity of the at least one sense line indicative of a change in structural health of the workpiece; and
a reader configured to interrogate the structural health management device to obtain information regarding the change in the continuity of the at least one sense line of the structural health management device.

9. A structural health management system of claim 8 further comprising a plurality of structural health management devices carried by and spaced apart upon the workpiece for monitoring the structural health of different portions of the workpiece.

10. A structural health management system of claim 8 wherein the at least one sense line is comprised of a material that melts upon exposure to a temperature above a predefined threshold.

11. A structural health management system of claim 8 wherein the structural health management device further comprises at least one of a gasket or membrane that carries the RFID tag and the at least one sense line and is configured to be mounted upon the workpiece.

12. A method for structural health management comprising:
- monitoring structural health of a workpiece with a structural health management device carried by the workpiece, wherein the structural health management device comprises a radiofrequency identification (RFID) tag comprising processing circuitry and an antenna configured to facilitate offboard communication, and
- at least one sense line communicably coupled to the RFID tag and configured to extend at least partially along the workpiece, wherein the at least one sense line includes a plurality of discrete first portions comprised of a material that dissolves in the presence of moisture and spaced apart along the at least one sense line and a plurality of discrete second portions positioned between and connecting the first portions and formed of a conductive material that does not dissolve in response to moisture, wherein the first portions of the at least one sense line are positioned along respective portions of the workpiece that are sensitive to moisture and the second portions of the at least one sense line are positioned along respective portions of the workpiece that are insensitive to moisture; and
- wherein monitoring the structural health of the workpiece comprises interrogating the at least one sense line with the processing circuitry of the RFID tag to determine a change in continuity of the at least one sense line indicative of a change in the structural health of the workpiece; and
- transmitting information regarding the change in continuity of the at least one sense line to be transmitted offboard the structural health management device via the antenna.

13. A method of claim 12 further comprising interrogating the structural health management device via a reader external to the workpiece, wherein transmitting information regarding the change in continuity is responsive to the interrogating.

14. A method of claim 13 further comprising providing a technician with an inspection plan including identification of the structural health management devices carried by the workpiece that are to be inspected, wherein interrogating the structural health management device comprises interrogating each structural health management device carried by the workpiece that is to be inspected, and wherein the method further comprises providing the technician with an indication of at least one of the structural health management devices that have been interrogated or the structural health management devices that remain to be interrogated and also an indication of the structural health of a portion of the workpiece associated with at least one of the structural health management devices that has been interrogated.

15. A method of claim 12 wherein interrogating the at least one sense line comprises interrogating the at least one sense line to determine an instance in which the at least one sense line is broken.

16. A method of claim 12 further comprising applying a gasket or membrane that carries the structural health management device to the workpiece.

17. A method of claim 12 further comprising storing information regarding maintenance of the workpiece in a memory device of the structural health management device.

18. A structural health management device of claim 1 wherein the first and second portions of the at least one sense line are alternately and serially positioned.

19. A structural health management system of claim 8 wherein the first and second portions of the at least one sense line are alternately and serially positioned.

20. A method of claim 12 wherein the first and second portions of the at least one sense line are alternately and serially positioned.

* * * * *